(12) United States Patent
Schön

(10) Patent No.: US 11,021,163 B2
(45) Date of Patent: Jun. 1, 2021

(54) METHOD FOR OPERATING A MOTOR VEHICLE SYSTEM ON THE BASIS OF A USER-SPECIFIC USER SETTING, STORAGE MEDIUM, ASSIGNMENT DEVICE, MOTOR VEHICLE AND SENSOR DEVICE FOR OPERATING ON THE INTERNET

(71) Applicant: Audi AG, Ingolstadt (DE)

(72) Inventor: Torsten Schön, Pietenfeld (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/649,836

(22) PCT Filed: Apr. 30, 2019

(86) PCT No.: PCT/EP2019/060997
§ 371 (c)(1),
(2) Date: Mar. 23, 2020

(87) PCT Pub. No.: WO2019/219369
PCT Pub. Date: Nov. 21, 2019

(65) Prior Publication Data
US 2020/0283000 A1    Sep. 10, 2020

(30) Foreign Application Priority Data
May 14, 2018   (DE) ...................... 10 2018 207 379.1

(51) Int. Cl.
*B60W 40/08*   (2012.01)
*G06N 3/08*    (2006.01)

(52) U.S. Cl.
CPC ............... *B60W 40/08* (2013.01); *G06N 3/08* (2013.01); *B60W 2040/0809* (2013.01); *B60W 2040/0872* (2013.01)

(58) Field of Classification Search
None
See application file for complete search history.

(56) References Cited

U.S. PATENT DOCUMENTS 9,707,911 B1 * 7/2017 Myers ..................... H04W 4/70
10,157,423 B1 * 12/2018 Fields .................. A61B 5/4064
(Continued)

FOREIGN PATENT DOCUMENTS

| CN | 105292055 A | 2/2016 |
| CN | 106882134 A | 6/2017 |

(Continued)

OTHER PUBLICATIONS

International Search Report and Written Opinion of the International Searching Authority directed to related International Patent Application No. PCT/EP2019/060997, with attached English-language translation, dated Aug. 1, 2019; 16 pages.

(Continued)

*Primary Examiner* — Jonathan M Dager
(74) *Attorney, Agent, or Firm* — Sterne, Kessler, Goldstein & Fox P.L.L.C.

(57) ABSTRACT

An approach is described for operating a motor vehicle system based on a user-specific user setting. A provided gene profile file is transferred to a deep learning engine that provides gene patterns of at least one predetermined gene range of persons and a respective preferred user setting for a large number of people. The deep learning engine processes the gene pattern of the person described by the gene profile file to thereby determine a configuration forecast of the user, the configuration forecast including a probability with which the user prefers one of the user settings. A user profile file is selected and transmitted to at least one motor vehicle system for configuring the at least one motor vehicle system based on the forecasted probability.

10 Claims, 1 Drawing Sheet

(56) References Cited

U.S. PATENT DOCUMENTS

| | | | |
|---|---|---|---|
| 10,198,505 B2 | 2/2019 | Frank et al. | |
| 10,259,468 B2* | 4/2019 | Avireddi | B60W 40/09 |
| 2012/0016827 A1 | 1/2012 | Evans et al. | |
| 2012/0071151 A1* | 3/2012 | Abramson | H04W 64/006 455/418 |
| 2013/0096733 A1* | 4/2013 | Manotas, Jr. | F02N 11/0807 701/2 |
| 2013/0322709 A1* | 12/2013 | Irani | G06F 21/36 382/124 |
| 2014/0278586 A1* | 9/2014 | Sanchez | G06Q 40/00 705/4 |
| 2015/0046060 A1* | 2/2015 | Nikovski | B60R 16/037 701/99 |
| 2015/0149017 A1* | 5/2015 | Attard | B60W 30/18163 701/23 |
| 2015/0307105 A1* | 10/2015 | Huber | B60W 50/14 340/576 |
| 2016/0092950 A1* | 3/2016 | Driscoll | G06Q 30/0633 705/26.8 |
| 2016/0104486 A1* | 4/2016 | Penilla | G10L 15/005 704/232 |
| 2016/0185358 A1* | 6/2016 | Todasco | A61B 5/6893 701/48 |
| 2017/0313323 A1* | 11/2017 | Tseng | B60W 10/00 |
| 2018/0012092 A1* | 1/2018 | Gleeson-May | G06K 9/00281 |
| 2018/0050171 A1* | 2/2018 | Tabert | A61B 5/7455 |
| 2018/0059913 A1* | 3/2018 | Penilla | B60W 40/08 |
| 2018/0075565 A1* | 3/2018 | Myers | G06Q 30/02 |
| 2018/0082683 A1* | 3/2018 | Chen | G06F 21/6263 |
| 2018/0144369 A1* | 5/2018 | Pouliot | B62D 15/0265 |
| 2018/0216946 A1* | 8/2018 | Gueye | H04W 4/029 |
| 2018/0237024 A1* | 8/2018 | Mummidi | G06N 5/04 |
| 2018/0365400 A1* | 12/2018 | Lopez-Hinojosa | B60R 25/257 |
| 2019/0049981 A1* | 2/2019 | Fischer | B60W 50/10 |
| 2019/0120654 A1* | 4/2019 | Todasco | G01C 21/3697 |
| 2020/0175429 A1* | 6/2020 | Beaurepaire | G06N 7/005 |
| 2020/0238952 A1* | 7/2020 | Lindsay | B60R 25/24 |

FOREIGN PATENT DOCUMENTS

| | | |
|---|---|---|
| DE | 102014207807 A1 | 10/2015 |
| DE | 102015113924 A1 | 2/2016 |
| DE | 112014003714 T5 | 4/2016 |
| DE | 102015207774 A1 | 11/2016 |
| DE | 102017105786 A1 | 9/2017 |
| WO | WO 2012/016827 A1 | 2/2012 |
| WO | WO 2013101054 A1 | 7/2013 |
| WO | WO 2016026028 A1 | 2/2016 |

OTHER PUBLICATIONS

International Preliminary Report on Patentability directed to related International Patent Application No. PCT/EP2019/060997, dated Nov. 17, 2020, with attached English-language translation; 14 pages.

International Search Report and Written Opinion of the International Searching Authority directed to related International Patent Application No. PCT/EP2019/060997, with attached English-language translation, dated Aug. 1, 2019; 23 pages.

Chinese Application No. 201980005099.5, Office Action dated Jan. 29, 2021; 6 pages.

* cited by examiner

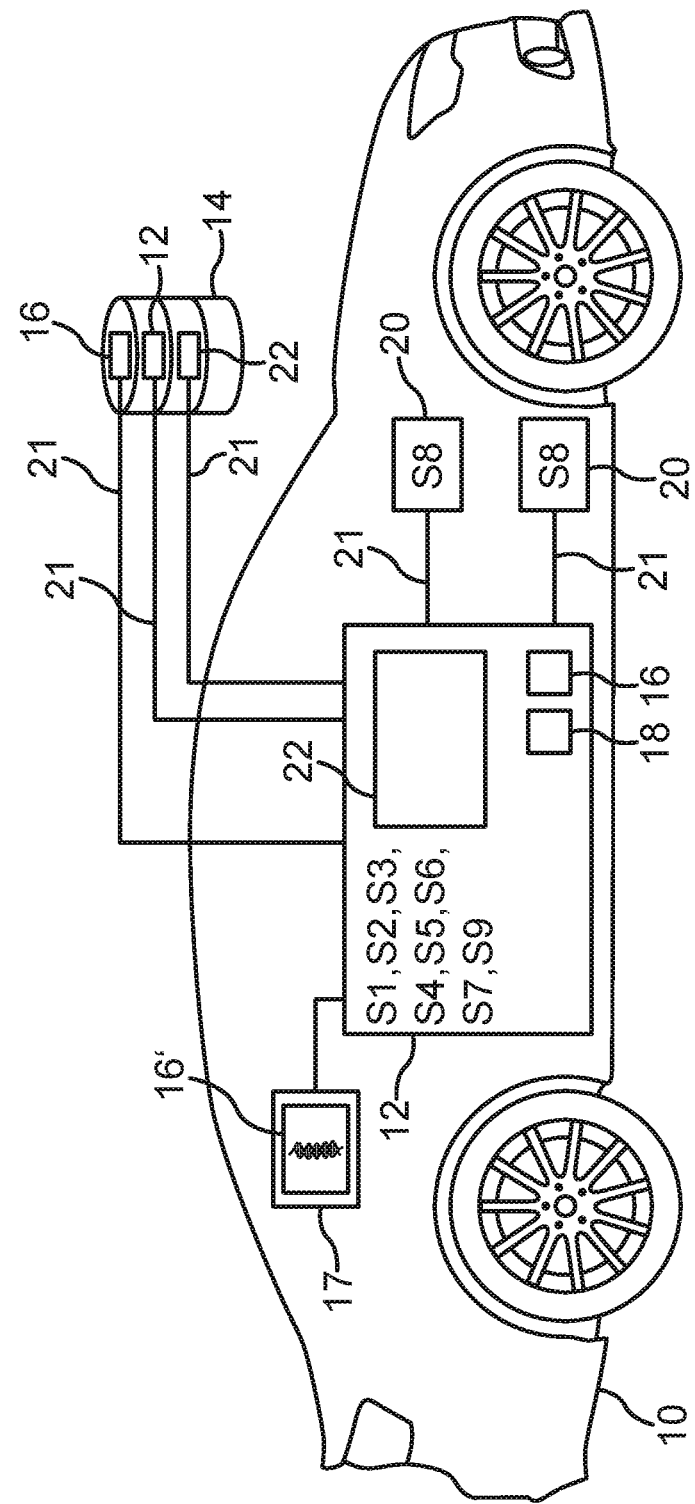

METHOD FOR OPERATING A MOTOR VEHICLE SYSTEM ON THE BASIS OF A USER-SPECIFIC USER SETTING, STORAGE MEDIUM, ASSIGNMENT DEVICE, MOTOR VEHICLE AND SENSOR DEVICE FOR OPERATING ON THE INTERNET

TECHNICAL FIELD

The present disclosure relates to a method for operating a motor vehicle system on the basis of a user-specific user setting. The motor vehicle system can be configured, for example, as an air conditioning system or infotainment system or a device for adjusting a seating position.

BACKGROUND

Preconditioning of a vehicle tailored to the driver is not carried out nowadays. As a rule, the driver—or another user of the motor vehicle—has to set and adjust the devices and systems of the motor vehicle to his preferences himself after boarding, provided that the settings have not already been made on the last trip anyway. A user of the motor vehicle must, therefore, individually and manually select for himself which vehicle settings are optimal for him.

DE 10 2015 207 774 A1 describes a device for identifying a driver during or after a journey with a vehicle and a vehicle.

DE 10 2017 105 786 A1 describes a method for identifying a person as a driver of a vehicle.

DE 10 2014 207 807 A1 discloses a method for person-specific support for a driver of a vehicle.

If the setting of a user-specific motor vehicle system configuration is provided at all by this prior art, this takes place after identification, that is to say, after the identity of the driver has been established. When identifying by means of a key or other object, the problem can arise that the configuration cannot be set if the user of the motor vehicle does not carry this object with him for identification. If an identity is determined, for example, on the basis of a radio key, it can happen that settings for the identity described by the exemplary radio key do not match a current user if the current user is not the person to whom the radio key is assigned. The user must, therefore, drive with settings that are not specific to him.

When identifying by means of a biometric feature, an expensive and complex sensor system is necessary, for example, a fingerprint sensor. Setting the configuration only works in motor vehicles that have such sensors. In addition, for example, in order to compare a scanned fingerprint, an image of the driver's fingerprint must be available as a reference, which can be problematic and/or undesirable in, for example, third-party motor vehicles. If the user drives a third-party motor vehicle that has, for example, a motor vehicle system that his own motor vehicle does not have, it may not even know what functions this motor vehicle system has and what can be set.

BRIEF DESCRIPTION OF DRAWINGS/FIGURES

FIG. 1 illustrates a schematic representation of a method and devices, in accordance with some embodiments.

DETAILED DESCRIPTION

One object of the present disclosure is to improve the adaptation of the motor vehicle system settings to personal needs.

The stated object is achieved by the method of the present disclosure and the devices according to the present disclosure of the independent claims. Advantageous developments are provided by the dependent claims.

In some embodiments, a deep learning engine may be operated. The deep learning engine, which, by analyzing genetic data, has learned to associate genetic patterns from a large number of people with vehicle-related properties. The vehicle-related properties mean the user preferences or the preferred settings of at least one motor vehicle system. A deep learning engine trained in this way can determine, preferably predict, which user settings the user most likely prefers based on a gene pattern of a current user of the motor vehicle. In other words, the identity of the current user is not ascertained, but rather an ascertainment, that is to say, for example, a prediction or forecast, of his preferences in relation to the user setting of the at least one motor vehicle system is performed.

In some embodiments, motor vehicle settings as a function of a gene pattern of the current user may be personalized. It is, therefore, not a matter of biometrically recording and ascertaining the driver's identity, but rather of predicting or forecasting the settings that he most likely prefers.

In some embodiments, at least one motor vehicle system can be personalized independently of the motor vehicle, that is to say also in a foreign motor vehicle, for example. No personal or even biometric data of the driver have to be stored in the motor vehicle. The settings of the user of foreign motor vehicle systems are made without the driver being aware that he likes these settings.

Many traits and behaviors are at least partially defined in genes. Through the training process of the deep learning engine, a connection can be made between, for example, a preference for dynamic driving in connection with a gene segment, for example, in connection with a gene. By identifying these gene segments, for example, these genes, a genetically based presetting of the vehicle for the driver, can take place. The user does not have to worry about setting his preferences unnecessarily, thereby saving time. In addition, he can focus even more attention on the traffic situation, which is why driving safety is significantly increased. In addition to the advantages already mentioned, there is a better customer loyalty for the motor vehicle manufacturer since the drivers using the motor vehicle are very satisfied with the predicted user-specific settings.

In some embodiments, a method according to the present disclosure for operating a motor vehicle system, for example, an air conditioning system or a driver assistance system, based on a user-specific user setting, has the following steps carried out by an assignment device. An assignment device is understood to mean a device or a device component for receiving and evaluating signals; the assignment device also being designed and set up for generating control signals. The assignment device can preferably be designed as a control device or control chip, and can preferably be arranged in the motor vehicle or a data server or data server network external to the motor vehicle.

In some embodiments, a gene profile file is described, which describes a gene pattern of a user of the motor vehicle. A gene pattern is understood to mean genetic information of a gene or gene section or a section of a nucleic acid. The gene pattern described describes, for example, a gene region or gene segment of a gene or genome of the user, for example, a nucleic acid sequence, and/or for example a base portion of the gene segment, and/or a gene expression profile, preferably by specifying a gene locus or several gene loci. In other words, the gene profile file can describe a gene pattern of a specified or predetermined gene segment.

In some embodiments, the provided gene profile file is transferred to a deep learning engine. The assignment device operates the deep learning engine, which statistically uses one or more gene patterns of at least one predetermined gene area and a respective preferred user setting for a large number of people as summarized below. The predetermined gene region is the same gene region for which the gene pattern of the user is described by the gene profile file. The respective preferred user setting can describe at least one parameter or a parameter set of a predetermined setting of the motor vehicle system.

The combination of the respective preferred user setting and the corresponding gene pattern can be referred to as an empirical value with which the deep learning engine can have been trained. An empirical value is understood to mean a value or an indication which, for example, based on empirical measurements or examination, makes a statement as to whether, for example, the preferred user setting correlates with the gene pattern of the gene region. By way of non-limiting example, the empirical value can be a numerical value or an assignment value. An empirical value is also understood to mean a functional dependency or a functional assignment that makes a statement as to whether or to which user setting the gene pattern can be assigned. In other words, an empirical value is, therefore, also understood to mean a rule for assignment based on numerical values.

In some embodiments, a deep learning engine is a device, a device component, or a program that can apply so-called deep learning (in-depth learning, machine learning) to a large number of data. By way of a non-limiting example, the deep learning engine is a sophisticated device for performing in-depth learning, that is, an implementation of artificial intelligence. In some cases, artificial intelligence, as well as machine learning and in-depth learning, can be implemented using the deep learning engine. The deep learning engine can, for example, be designed or configured as a deep, artificial neural network, that is, for example, can be set up to use a machine learning method to generate a large number of empirical values, training data or a dataset, according to a predetermined algorithm and evaluate on the basis of the already stored large number of empirical values, for example, via a logic contained therein, for example, a correlation.

This also enables further logical links to be created in the deep learning engine. Empirical values or training data can, for example, be statistically combined into a large number of gene patterns of one or more gene segments, which, for example, meet a match criterion. Such a match criterion can, for example, describe a minimum probability that the person with this gene pattern prefers the user setting.

In some embodiments, the training data or empirical values can be summarized, for example, as an artificial neural network and, for example, come from a database and assign user settings to the respective gene sequences. Such data on gene patterns in a number of >1000, in particular >10,000, can be used to train the deep learning engine, the training data being acquired over a predetermined observation period. Such a data set can be called big data set.

In some embodiments, by operating the deep learning engine, instead of statistical evaluation via, for example, an assignment list, dynamic forecasting or prediction of a preferred user setting of the current driver/user takes place. For this purpose, the assignment device processes the gene pattern of the user described by the gene profile file provided, using the deep learning engine, and thereby ascertains a configuration forecast of the user, the configuration forecast comprising a probability with which the user prefers one of the user settings.

In some embodiments, if the probability of preference or preference of one of the user settings reaches or exceeds a predetermined threshold value, the configuration forecast is used to select a user profile file from a plurality of user profile files that describes a data record for setting at least one parameter describing the preferred user setting of at least one motor vehicle system. For example, the data set can write preferred air conditioning settings.

In some embodiments, the assignment device transfers the selected user profile file to at least one motor vehicle system to configure the at least one motor vehicle system, that is to say, to set the parameters described by the data record.

The settings of the motor vehicle system can then be made according to embodiments described herein.

In some embodiments, a user preference can be predicted, even with drivers with a previously unknown gene pattern, with regard to a configuration of the at least one motor vehicle system.

In some embodiments, the gene pattern described by the gene profile file provided can be processed, for example, by an alignment of a gene sequence described therein, but preferably by matching. Matching is a method that connects similar observations in two or more data sets. In a matching, one or more similar observations from the other data set are assigned based on common characteristics of observations from the data set. This enables joint analysis of the data. For example, a threshold value can be specified for the matching, but with the probability or from which degree of an agreement, the current user is highly likely to prefer a particular user setting. With the matching, for example, correlation analysis can be carried out.

In some embodiments, if, for example, several of the user settings of the empirical values are possible, the user setting with the highest probability and/or the best matching can then be selected.

In some embodiments, the deep learning engine can optionally check a plurality of user profile files, each of which can describe a set of parameter values, on the basis of empirical values stored in the assignment device, to determine whether the respective set of parameter values fulfills a predetermined matching criterion that can describe an at least partial matching of the respective gene pattern of empirical values with the genotype of the user and the threshold.

In some embodiments, the gene profile file is made available by receiving the gene profile file from a server device external to the motor vehicle and/or from a storage device, for example, from a portable storage device, the current user is even more independent of the motor vehicle that he is using. In other words, it is easy for him to have motor vehicle systems of foreign vehicles set in a user-specific manner. By way of a non-limiting example, in some embodiments, the gene profile file can be provided by generating the gene profile file through the assignment device. The assignment device can generate the gene profile file, for example, using information that describes a nucleic acid sequence of the gene segment and/or information on data for microarray analysis of the gene segment. In other words, it is possible for the user, for example, to carry out such an analysis or such a sequencing on the basis of a cross-check, and then to use the data obtained in this way in the future to personalize motor vehicles.

In some embodiments, the value of the parameter can describe a predefined setting of the at least one motor vehicle system, for example, a setting of a seating position and/or an air conditioning system and/or a background image of a screen of the motor vehicle. These are particularly important and interesting settings while driving.

In some embodiments, the object is achieved by a storage medium with a program code, the program code being set up to carry out a method according to one of the described embodiments when executed by a processor device. By way of a non-limiting example, the program code is set up, when executed by a processor device on the assignment device, to carry out the corresponding methods. The storage medium can be designed as a common data storage device, for example, as a memory card or USB stick. A processor device is understood to mean a device component or a component for electronic data processing, which can have at least one microcontroller and/or at least one microprocessor.

In some embodiments, the assignment device can be configured, for example, as a control board or control chip or as a user program ("app"). The assignment device can have a deep learning engine trained for the method according to the present disclosure.

In some embodiments, a motor vehicle, which has an embodiment of the allocation device according to the present disclosure and/or an embodiment of the storage medium according to the present disclosure is disclosed. The motor vehicle can be designed as a motor vehicle, for example, as a passenger car.

In some embodiments, a server device for operating on the Internet is disclosed. The server device may have an allocation device according to one of the above-described embodiments and/or a storage medium according to one of the above-described embodiments. The server device can be designed, for example, as a computer, server on the Internet, or server network, or for example, as a so-called "data cloud." The server device can have a deep learning engine trained for the method according to the present disclosure.

The present disclosure also includes the combinations of the described embodiments.

Exemplary embodiments of the present disclosure are described below with reference to FIG. 1 that shows a schematic representation of an embodiment of the method and the devices according to the present disclosure.

The exemplary embodiments explained below are preferred embodiments of the present disclosure. In the exemplary embodiments, the components of the embodiments that are described each constitute individual features of the present disclosure to be considered independently of each other, and in a combination that is different from the combination described. In addition, the embodiments described may also be supplemented by further features of the present disclosure, which have already been described.

In FIG. 1, the same reference numerals designate elements that have the same function.

FIG. 1 illustrates the principle of the method according to the present disclosure using an exemplary embodiment. FIG. 1 shows a motor vehicle 10, for example, a passenger car, wherein the motor vehicle 10 can have an assignment device 12. The method steps of the assignment device 12 described in FIG. 1 can alternatively be carried out, for example, by an optional assignment device 12 of a server device 14 external to the motor vehicle. However, for reasons of a better overview, the corresponding method steps of the assignment device 12 are not additionally shown in the assignment device 12 of the server device 14 external to the motor vehicle. In accordance with some embodiments, by way of a non-limiting example, the assignment device 12 can include motor vehicle components and server-internal components.

In order to carry out the method according to the present disclosure, corresponding program code can be stored on a storage device 16, the optional storage device 16 being part of the assignment device 12, for example. The storage device 16 can be configured, for example, as a memory or SD card. To execute the program code, the assignment device 12 can have a processor device 18, which can have, for example, a plurality of microprocessors. The storage device 16, which can also be referred to as a storage medium, can be a component of the server device 14 external to the motor vehicle, for example. The server device 14 can be configured, for example, as a backend or as a data cloud.

The motor vehicle 10 has at least one motor vehicle system 20, for example, an air conditioning system. The motor vehicle system 20 can alternatively be, for example, a device for setting a seating position or an infotainment system, via which, for example, a background image for a welcome screen image, background image, or a favorites list of navigation destinations can be set.

The individual components are connected to one another by means of data communication connections 21, for example by means of a wired data communication connection 21, for example, a cable or a data bus, or for example by means of a wireless data communication connection 21, for example, a mobile radio connection, internet connection, WLAN connection and/or Bluetooth Low Energy Connection.

The FIG. 1 shows an example of a further motor vehicle system 20, for example, a radio.

In accordance with some embodiments, the assignment device 12 can have a deep learning engine 22, which can be integrated in the assignment device 12 external to the motor vehicle and/or in the server device 14 external to the motor vehicle. By way of a non-limiting example, such a deep learning engine 22, which is external to the motor vehicle, can be remotely controlled by an internal assignment device 12.

In accordance with some embodiments, the deep learning engine 22 can be designed, for example, as an artificial neural network, which, for example, based on empirical values from a large number of people whose gene patterns have been analyzed and correlated with specific user-specific settings of the exemplary motor vehicle systems 20, can apply statistical analysis methods such as main component regression, to a gene pattern of a current driver (or other user of the motor vehicle 10). If the deep learning engine 22 is, for example, a component of the assignment device 12 of the motor vehicle 10, it can communicate, for example, with the storage device 16 of the server device 14 external to the motor vehicle, the gene patterns of a large number of people, i.e., the gene patterns of the training data, being stored on this storage device 16 external to the motor vehicle. By way of a non-limiting example, the gene profile file of the current user of the motor vehicle 10 can also be stored on such a storage device 16 external to the motor vehicle in a user account of the current user. The deep learning engine 22 may have been trained offline, for example.

In some embodiments, the current user of the motor vehicle can, for example, when purchasing the motor vehicle 10, and after accepting the use of his data by, for example, a provider of a service or by the motor vehicle manufacturer, submit a hair sample or saliva sample, which can then be sequenced, for example, or can be examined with the help of, for example, a microarray analysis for the gene pattern. The use of the information in the gene profile file, which can be created after evaluating the nucleic acid analysis, can be regulated by a data protection guideline.

The gene profile file (S1), which describes, for example, a nucleic acid sequence or information about which quantitative base fractions, for example, a particular gene segment of a particular gene of the user, can be provided (S1), for example, in which the gene profile file is stored by the external storage device 16 can be accessed. The gene profile file can contain, for example, information about the locus on which the gene pattern described by the gene profile file can be located.

In the example of FIG. 1, an optional storage device 16', which is structurally separate from the assignment device 12, is shown, which can be configured, for example, as a portable storage medium, for example, as a USB stick or as a memory card. For example, the gene profile file with the information about the gene pattern can be stored on the portable storage device 16' and thus made available to the assignment device 12 by, for example, inserting the portable storage device 16'.

In accordance with some embodiments, the deep learning engine 22 can, for example, communicate with a mobile terminal (not shown in the FIGURE) and, for example, call up the gene profile file of the current user from it.

The gene profile file provided is transmitted to the deep learning engine 22 in method step S2.

In accordance with some embodiments, the deep learning engine 22 (S3) can be operated, for example, by remote control if the deep learning engine 22 is a deep learning engine external to the motor vehicle.

In accordance with some embodiments, the deep learning engine 22 (S3) can be operated, for example, by controlling the deep learning engine 22 in such a way that the gene profile file stored in the storage device 16, for example, can be checked for compliance with a matching criterion via an algorithm that can describe a rule for fulfilling such a matching criterion. The matching criterion can, for example, stipulate that when a match is made with said minimum requirement for matching, the setting "radio station with techno music" is preferred to a high percentage or to a high degree of probability by the user.

In accordance with some embodiments, the processing of the user's gene pattern (S4) can preferably take place via a matching (S9). The exemplary neural network of the deep learning engine 22, as an exemplary output node of the neural network, that is to say as an exemplary output value, can establish when determining the configuration forecast (S5) that the gene pattern of the current user can be assigned, for example, to a predetermined music preference and thus, for example, predict a user setting to tune a radio station with techno music as the preferred user setting for a radio. This configuration prognosis can be based, for example, on the fact that, during the training of the deep learning engine 22, the exemplary artificial intelligence "learned" that the gene pattern with a high degree of similarity, that is to say, for example, with an agreement of a minimum percentage, for example, with a specific gene sequence occurs in those users who frequently tune to a radio station with techno music while driving.

Another exemplary, alternative or additional starting point can be, for example, a setting of the heating of the climate conditioning system to a continuous 20° C., or, instead of an exemplary numerical value, a temperature range or a relative temperature specification. Another exemplary starting point can be, for example, a user setting for sporty driving behavior, that is, a qualitative user setting. Such a sporty driving style can be set later, for example, as a parameter for setting a driver assistance system.

In the example of the FIGURE, for example, a threshold value of 70% can be set, and the exemplary matching can show that the current user matches 95% in his gene pattern with that of the large number of people who specify this radio station setting or climate conditioning setting as the preferred user setting to have.

For each output node, for example, a plurality of user profile files can be stored in the storage device 16 of the server device 14, which, for example, can describe corresponding sets of parameters (or individual parameter values) for setting the exemplary air conditioning system and the exemplary radio. In the example of the FIGURE, a user profile file can then be selected in method step S6, which can describe a data record that can describe the settings, for example, a wavelength of the radio transmitter with the techno music and/or a data record for setting the exemplary heating to 20° C. This user profile file is then transmitted to the motor vehicle system 20, additionally or alternatively to, for example, a control unit of the motor vehicle 10 for setting the motor vehicle systems 20 (S7).

The presumably preferred settings, which are described by this user profile file, are then set in the motor vehicle system (S8). By way of a non-limiting example, the configuration S8 can be carried out by the assignment device 12.

Overall, the exemplary embodiment illustrates how, by means of the present disclosure, vehicle settings can be made available by means of machine learning using, for example, a gene pattern, for example, a gene expression profile.

According to a further exemplary embodiment, genetic analyses of a large number of users can be learned, for example, by analyzing genetic data, which are related to vehicle-related properties, that is to say, with user settings. For a user, for example, the personal genome can then be sequenced and analyzed, for example, and the individual vehicle properties predicted for the user.

To train the machine learning algorithm, gene expression data, for example, via microarray, can be collected from a large number of vehicle users. Furthermore, vehicle-related data such as vehicle settings and/or preferences of the same people or users can be queried and/or collected.

With this data, a deep neural network can be trained, which can receive the individual values from the gene expression data as input values. The neural network can get and/or create an output node for each vehicle setting value and/or for each preference.

With the aid of the training data, the neural network can be trained in such a way that the input data match the corresponding output values, which corresponds to the functioning of an artificial neural network.

By way of a non-limiting example, a gene sample can be taken from the user for an application (for example, a hair) and sent to a laboratory for evaluation, in which the same gene expression profile can be created as for the subjects of the training data. These values can be fed into the trained model, and, for example, a value can be predicted for each output node. This is used to make the vehicle settings of the current user.

The invention claimed is:

1. A method for operating a motor vehicle system based on a user-specific user setting, the method comprising:
   providing, by an assignment device, a gene profile file comprising a gene pattern of a user of the motor vehicle system, wherein the gene pattern describes a gene region of a genome of the user;
transferring, by the assignment device, the gene profile file to a deep learning engine;
processing, by the assignment device, the gene pattern based on the gene profile file using the deep learning engine;
operating, by the assignment device, the deep learning engine to provide the gene pattern of the gene region of the genome of the user and a corresponding plurality of preferred user settings;
determining, by the assignment device, a probability of a preferred user setting of the plurality of preferred user settings being a preferred user setting;
in response to the probability of the preferred user setting exceeding a predetermined threshold, selecting, by the assignment device, a user profile file of a plurality of user profile files that comprises a data set for setting at least one parameter of the motor vehicle system according to the preferred user setting; and
transferring, by the assignment device, the selected user profile file to the motor vehicle system for configuring the motor vehicle system.

2. The method of claim 1, wherein the user profile file further comprises a set of parameter values, the method further comprising:
evaluating, by the assignment device, and by using the deep learning engine, the user profile file on a basis of a plurality of values stored in the assignment device to determine whether the set of parameter values fulfills a predetermined matching criterion that corresponds with an at least partial agreement of a gene pattern described in the user profile file with the gene pattern of the user and the threshold value.

3. The method of claim 1, further comprising:
receiving the gene profile file from a storage device or a server device external to the motor vehicle.

4. The method of claim 1, further comprising:
generating the gene profile file based on information on a nucleic acid sequence of a gene segment or data on a microarray analysis of the gene segment.

5. The method of claim 1, wherein the at least one parameter of the motor vehicle system is a setting of a seating position, an air conditioning system, or a background image of a screen.

6. A storage medium comprising program code which, when executed by a processor of an assignment device, causes the processor to:
provide a gene profile file comprising a gene pattern of a user of a motor vehicle system, wherein the gene pattern describes a gene region of a genome of the user;
transfer the gene profile file to the deep learning engine;
process the gene pattern based on the gene profile file using the deep learning engine;
operate the deep learning engine to provide the gene pattern of the gene region of the genome of the user and a corresponding plurality of preferred user settings;
determine a probability of a preferred user setting of the plurality of preferred user settings being a preferred user setting;
in response to the probability of the preferred user setting exceeding a predetermined threshold, select a user profile file of a plurality of user profile files that comprises a data set for setting at least one parameter of the motor vehicle system according to the preferred user setting; and
transfer the selected user profile file to the motor vehicle system for configuring the motor vehicle system.

7. An assignment device comprising:
a storage device;
a deep learning engine; and
a processor device configured to perform operations stored in the storage device, the operations comprising:
providing a gene profile file comprising a gene pattern of a user of a motor vehicle system, wherein the gene pattern describes a gene region of a genome of the user;
transferring the gene profile file to the deep learning engine;
processing the gene pattern based on the gene profile file using the deep learning engine;
operating the deep learning engine to provide the gene pattern of the gene region of the genome of the user and a corresponding plurality of preferred user settings;
determining a probability of a preferred user setting of the plurality of preferred user settings being a preferred user setting;
in response to the probability of the preferred user setting exceeding a predetermined threshold, selecting a user profile file of a plurality of user profile files that comprises a data set for setting at least one parameter of the motor vehicle system according to the preferred user setting; and
transferring the selected user profile file to the motor vehicle system for configuring the motor vehicle system.

8. The assignment device of claim 7, wherein the at least one parameter of the motor vehicle system is a setting of a seating position, an air conditioning system, or a background image of a screen.

9. A motor vehicle comprising:
a motor vehicle system including an air conditioning system, a radio, an infotainment system, or a device for adjusting a seating position;
an assignment device comprising:
a storage device;
a deep learning engine; and
a processor device configured to perform operations stored in the storage device, the operations comprising:
providing a gene profile file comprising a gene pattern of a user of the motor vehicle system, wherein the gene pattern describes a gene region of a genome of the user;
transferring the gene profile file to the deep learning engine;
processing the gene pattern based on the gene profile file using the deep learning engine;
operating the deep learning engine to provide the gene pattern of the gene region of the genome of the user and a corresponding plurality of preferred user settings;
determining a probability of a preferred user setting of the plurality of preferred user settings being a preferred user setting;
in response to the probability of the preferred user setting exceeding a predetermined threshold, selecting a user profile file of a plurality of user profile files that comprises a data set for setting at least one parameter of the motor vehicle system according to the preferred user setting; and
transferring the selected user profile file to the motor vehicle system for configuring the motor vehicle system.

10. A server device external to a motor vehicle, comprising:
- a communications connection;
- an assignment device comprising:
    - a storage device;
    - a deep learning engine; and
    - a processor device configured to perform operations stored in the storage device, the operations comprising:
        - providing a gene profile file comprising a gene pattern of a user of a motor vehicle system, wherein the gene pattern describes a gene region of a genome of the user;
        - transferring the gene profile file to the deep learning engine;
        - processing the gene pattern based on the gene profile file using the deep learning engine;
        - operating the deep learning engine to provide the gene pattern of the gene region of the genome of the user and a corresponding plurality of preferred user settings;
        - determining a probability of a preferred user setting of the plurality of preferred user settings being a preferred user setting;
        - in response to the probability of the preferred user setting exceeding a predetermined threshold, selecting a user profile file of a plurality of user profile files that comprises a data set for setting at least one parameter of the motor vehicle system according to the preferred user setting; and
        - transferring the selected user profile file via the communications connection to the motor vehicle system for configuring the motor vehicle system.

* * * * *